United States Patent
Dai et al.

(10) Patent No.: US 8,941,944 B1
(45) Date of Patent: Jan. 27, 2015

(54) SYSTEM AND METHOD FOR EVENLY DISTRIBUTING THERMAL EXPOSURE TO DISK IN HEAT-ASSISTED MAGNETIC RECORDING (HAMR)

(71) Applicant: HGST Netherlands B.V., Amsterdam (NL)

(72) Inventors: Qing Dai, San Jose, CA (US); Xing-Cai Guo, Tracy, CA (US); Cyril Guyot, San Jose, CA (US); Lidu Huang, Danville, CA (US); Bruno Marchon, Palo Alto, CA (US); Erhard Schreck, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/292,338

(22) Filed: May 30, 2014

(51) Int. Cl.
*G11B 21/02* (2006.01)

(52) U.S. Cl.
USPC ............................. 360/75; 360/31; 369/13.17

(58) Field of Classification Search
CPC .. G11B 20/18; G11B 5/02; G11B 2005/0002; G11B 5/4866; G11B 2005/0021; G11B 5/314; G11B 5/6088; G11B 2005/001; G11B 5/012; G11B 5/596
USPC .......... 369/13.17, 13.33, 13.13, 13.32, 13.14, 369/13.02; 360/59, 31, 39, 55, 75, 77.06, 360/77.07
See application file for complete search history.

(56) References Cited

U.S. PATENT DOCUMENTS

| | | | |
|---|---|---|---|
| 8,339,905 B2 * | 12/2012 | Rausch et al. | 369/13.33 |
| 8,559,121 B2 | 10/2013 | Saito et al. | |
| 8,638,521 B2 * | 1/2014 | Kimizuka | 360/75 |
| 8,837,065 B1 * | 9/2014 | Mircea et al. | 360/31 |
| 2012/0162814 A1 | 6/2012 | Kimizuka | |
| 2013/0232292 A1 | 9/2013 | Bandic et al. | |

FOREIGN PATENT DOCUMENTS

JP   2011-134385 A   7/2011

OTHER PUBLICATIONS

Greaves et al., "Shingled recording for 2-3 Tbit/in 2," Magnetics, IEEE Transactions on, (Oct. 2009) 45 (10): 3823,3829. Abstract Only.
Kikitsu, A., "Prospects for bit patterned media for high-density magnetic recording," Journal of Magnetism and Magnetic Materials (Mar. 2009) 321 (6): 526-530. Abstract Only.
McDaniel, T.W., "Ultimate limits to thermally assisted magnetic recording," Journal of Physics: Condensed Matter (Feb. 4, 2005) 17 (7): R315. Abstract Only.

(Continued)

*Primary Examiner* — Ali Neyzari
(74) *Attorney, Agent, or Firm* — Billion & Armitage; Michael A. Collins (57) ABSTRACT

A method of radially positioning a heat assisted magnetic recording (HAMR) head writes data to a first band, wherein a radial position of the HAMR head within each data track is defined by a positional bias and a track location. A determination is made regarding whether a threshold has been reached with respect to the first band. If the write threshold has been reached with respect to the first band, then the positional bias associated with the first band is modified to evenly distribute thermal exposure of data tracks in the first band.

21 Claims, 10 Drawing Sheets

(56) References Cited

OTHER PUBLICATIONS

Shi et al., "Media noise analysis in shingled magnetic recording," Magnetics, IEEE Transactions on, (Oct. 2011) 47 (10): 2292,2995. Abstract Only.

Weller et al., "Media for extremely high density recording," Advanced Magnetic Nanostrutures (2006): 295-324. Abstract Only.

Wood et al., "The feasibility of magnetic recording at 10 terabits per square inch on conventional media," Mangetics, IEEE Transactions on, (Feb. 2009) 45 (2): 917,923. Abstract Only.

* cited by examiner

SYSTEM AND METHOD FOR EVENLY DISTRIBUTING THERMAL EXPOSURE TO DISK IN HEAT-ASSISTED MAGNETIC RECORDING (HAMR)

TECHNICAL FIELD

This disclosure relates generally to magnetic storage systems and in particular to heat-assisted magnetic recording (HAMR) systems.

BACKGROUND

To increase capacity of magnetic storage systems, efforts are continually made to increase magnetic recording density. Three competing requirements affect how densely data can be written to a magnetic recording medium: writeability, readability, and stability. Writeability refers to how densely data may be written to the magnetic recording medium. Readability refers to whether a magnetic reader can accurately read data written to the magnetic recording medium at a particular densely, and stability means whether the data—once written—retains the desired direction of magnetization (i.e., does not "flip" directions). For example, as bit size of data written to the magnetic media decreases in size, the coercivity of the material must increase in order to maintain the desired stability. As the coercivity of the material increases, the magnitude of the magnetic write field required to change the magnetic orientation of a particular bit becomes prohibitively large. That is, the coercivity is so high that the magnetic field cannot be made strong enough to permanently affect the direction of magnetization and data can no longer be written to the disk.

Heat-assisted magnetic recording (HAMR) provides one method of overcoming this limitation to traditional magnetic recording. In a HAMR system, a laser or other heat source is used to supply a high-temperature thermal pulse to the area of the magnetic media being written. By heating the magnetic media, the coercivity of the material is temporarily lowered, allowing a corresponding magnetic write field to change the magnetic orientation of the bit to a desired direction. Once the bit has been written, the magnetic media cools and the coercivity increases to a level that provides the desired stability.

One drawback of HAMR is that the high-temperature thermal pulse applied to the magnetic media causes carbon oxidation of the magnetic media. That is, some of the material itself is eroded with each write operation. After a certain number of write operations, the material is sufficiently eroded that it can no longer be written to.

It would therefore be beneficial to reduce the effect of these high-temperature thermal pulses on the magnetic media.

SUMMARY

In general, this disclosure describes techniques for evenly distributing exposure of a magnetic media to thermal energy provided as part of a heat-assisted magnetic recording (HAMR) system.

According to one example of the disclosure, a method of radially positioning a heat assisted magnetic recording (HAMR) head writes data to a first band, wherein a radial position of the HAMR head within each data track is defined by a positional bias and a track location. A determination is made regarding whether a threshold has been reached with respect to the first band. If the write threshold has been reached with respect to the first band, then the positional bias associated with the first band is modified to evenly distribute thermal exposure of data tracks in the first band.

According to another example of the disclosure, a servo positioning system for a heat-assisted magnetic recording (HAMR) system includes a servo position demodulator and a servo control processor. The servo position demodulator generates feedback regarding radial position of a read head with respect to a data track within one of a plurality of bands. The servo control processor controls radial position of the read head based on a position command, a positional bias associated with the band being written, and the radial position feedback, wherein the servo control processor modifies the positional bias associated with one of the plurality of bands in response to a threshold being reached with respect to the band.

According to another embodiment, a heat-assisted magnetic recording (HAMR) system includes a magnetic media, a heat-assisted read/write head, an actuator arm, a voice coil motor, and a servo control processor. The magnetic media is comprised of a plurality of bands, each band comprised of a plurality of data tracks. The actuator arm supports the heat-assisted read/write head and the voice coil motor is connected to the actuator arm to selectively locate the heat-assisted read/write head over a specified data track on the magnetic media. The servo control processor controls radial position of the read head based on a position command and a positional bias associated with each of the plurality of bands, wherein the servo control processor selectively modifies the positional bias associated with each of the plurality of bands to evenly distribute thermal exposure of the magnetic media.

DETAILED DESCRIPTION

The present disclosure describes a system and method for distributing thermal energy provided in heat-assisted magnetic recording (HAMR) systems evenly across the magnetic media, and in particular across the entire width of the data tracks being written.

Figure 1:
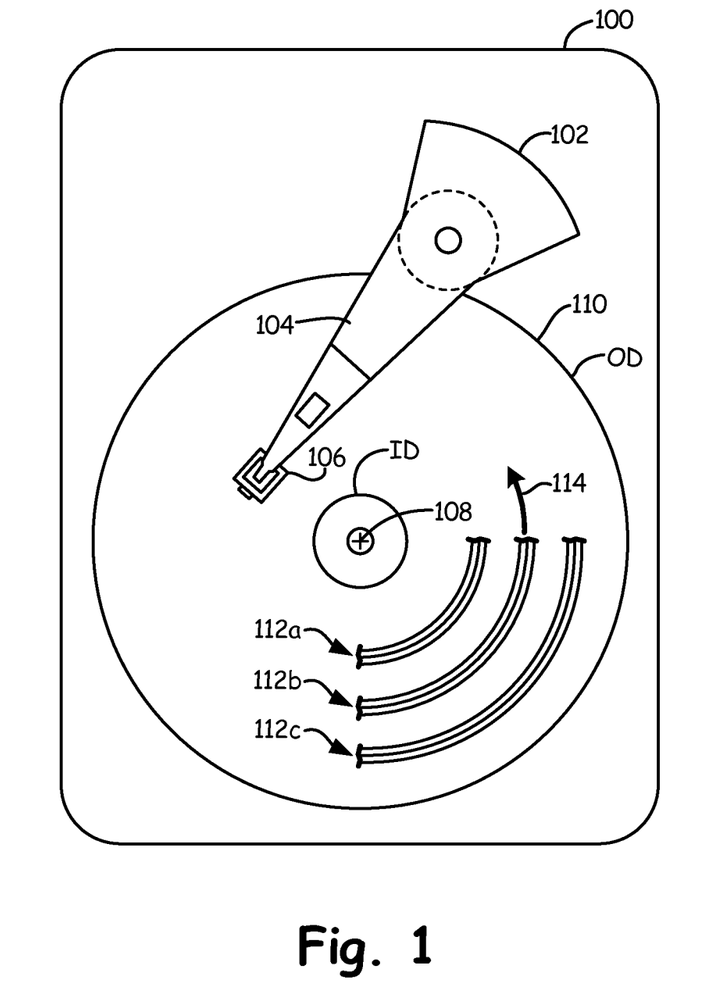
FIG. 1 is a block diagram of a hard disk drive (HDD) according to an embodiment of the present invention.

FIG. 1 is a block diagram of hard disk drive (HDD) 100 according to an embodiment of the present invention. HDD 100 includes voice coil motor (VCM) 102, actuator arm 104, head-assisted magnetic recording (HAMR) read/write head 106, spindle 108, and magnetic media 110. As discussed in more detail with respect to FIG. 2, HAMR read/write head 106 utilizes a heat source to provide a high-temperature thermal pulse to a localized portion of magnetic media 110 during write operations.

Magnetic media 110 is mounted on spindle 108, which rotates the magnetic media 110 in a direction indicated by arrow 114. Magnetic media is comprised of a plurality of circular tracks. In the embodiment shown in FIG. 1, the plurality of data tracks are organized into a plurality of bands 112a, 112b, and 112c, wherein each band includes a plurality of concentric and adjacent data tracks.

Read/write head 106 is supported by actuator arm 104, which is mechanically positioned over a desired track by VCM 102. That is, VCM 102 and actuator arm 104 determine the radial position of read/write head 106, allowing read/write head 106 to selectively read and/or write data to each of the plurality of data tracks extending from the inner diameter (ID) to the outer diameter (OD). In particular, a servo control system (shown in more detail with respect to FIG. 6) controls the operation of VCM 102 to place HAMR read/write head 106 over the desired track. As discussed in more detail below, servo control systems are very good at accurately locating HAMR read/write head 106 over the center of a desired data track. To evenly distribute exposure to thermal energy resulting from a plurality of HAMR write operations, the servo control system selectively introduces a positional bias to the servo control system, such that HAMR read/write head 106 is selectively offset from the center track position during write operations. By modifying the positional bias at selected intervals, data tracks associated with magnetic media 110 are exposed to an even distribution of thermal energy.

Figure 2:
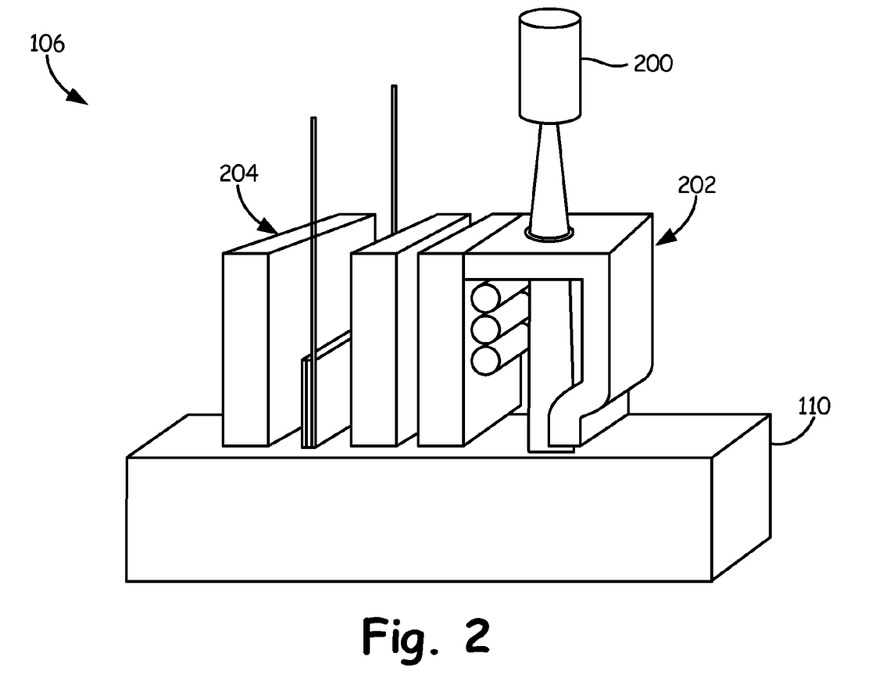
FIG. 2 is a perspective view of a heat-assisted magnetic recording (HAMR) system according to an embodiment of the present invention.

FIG. 2 is a simplified perspective view of HAMR read/write head 106 that illustrates the use of HAMR to assist in write operations according to an embodiment of the present invention. In particular, HAMR read/write head 106 includes laser 200, write coil 202, and read sensor 204. Although simplified, FIG. 2 illustrates the use of laser 200 to provide a high-temperature thermal pulse to the portion of magnetic media 110 to be written. The portion of the magnetic media heated by laser 200 passes under write coil 202, which generates a magnetic field sufficient to change the direction of magnetization of magnetic media 110. In the embodiment shown in FIG. 2, read sensor 204 is located separately from write coil 202, but in other embodiments may be incorporated as part of write coil 202.

Figure 3:
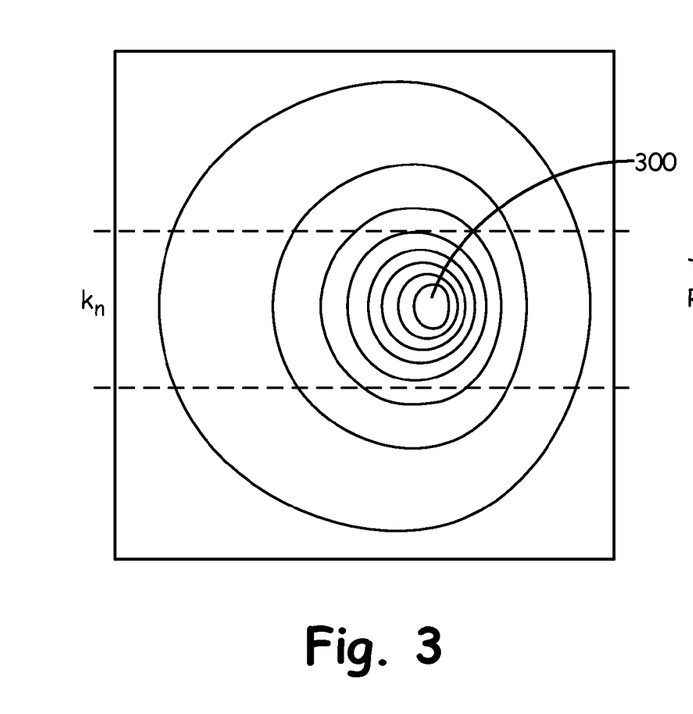
FIG. 3 is a heat profile illustrating a distribution of heat provided by a high-temperature thermal pulse utilized in HAMR systems according to an embodiment of the present invention.

FIG. 3 is a heat profile illustrating distribution of heat associated with the magnetic media as a result of a high-temperature thermal pulse provided by laser 200 (shown in FIG. 2). In the embodiment shown in FIG. 3, the heat profile is illustrated with respect to a data track labeled "track n". A center portion 300 illustrates the highest temperatures resulting from the high-temperature thermal pulse, with temperatures decreasing in a radially outward direction from center portion 300. The heat profile illustrates that the high-temperature thermal pulse is not distributed evenly across the entire width of the data track. Rather, a center portion of the data track is exposed to more thermal energy than edges or outer portions of the data track. The present disclosure is not concerned with changing and/or improving the heat profile resulting from the high-temperature thermal pulse. Rather, the present disclosure accepts the prospect of an uneven heat profile and acts to evenly distributed exposure of the magnetic media to the thermal pulse by selectively biasing the position of HAMR read/write head 106 during write operations.

Figure 4:
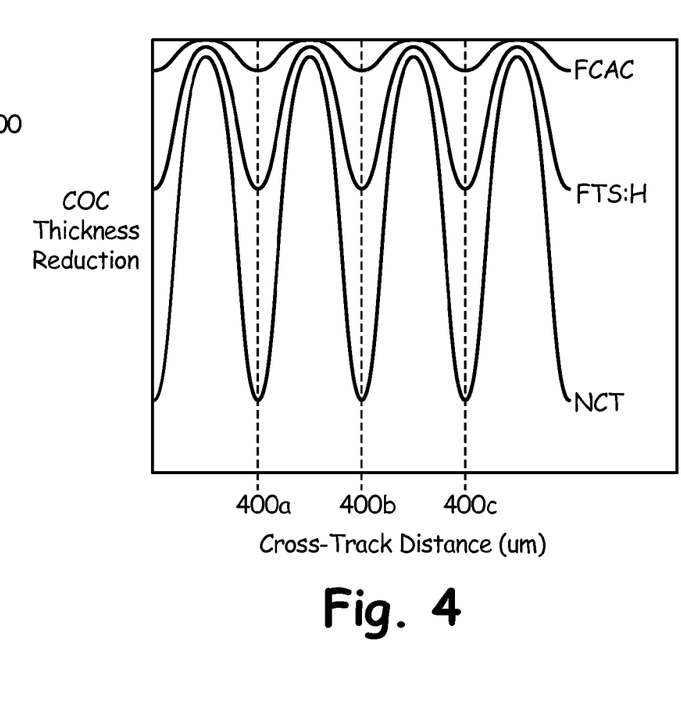
FIG. 4 is a graph illustrating predicted erosion of a magnetic media material in a cross-track direction as a result of the magnetic media's exposure to thermal energy provided during repeated HAMR write operations according to an embodiment of the present invention.

FIG. 4 is a graph that illustrates predicted erosion of a magnetic media material in a cross-track direction as a result of repeated write operations using HAMR. As shown with respect to FIG. 3, the heat profile generated by a high-temperature thermal pulse is not evenly distributed along the width of the data track. Rather, portions of the data track are subject to higher temperatures than other portions of the same track. FIG. 4 illustrates the uneven erosion of magnetic media as a result of this uneven exposure of each data track to thermal energy.

The erosion prediction illustrated in FIG. 4 is based on a worst-case scenario of 100% write operations, for five years, with five-hundred degree max temperatures, and a full-width half-maximum (FWHM) thermal pulse profile that is 70% of track pitch. The x-axis represents distance in a cross-track direction, and the y-axis represents thickness reduction of magnetic media 110, with sharp valleys illustrating increased erosion. The prediction was made for various magnetic media technologies, including new carbon technology (labeled "NCT"), facing target sputtering technology (labeled "FTS"), and filtered cathodic arc technology (labeled "FCAC"). All three technologies exhibit significant erosion at the center of each data track, labeled 400a, 400b, and 400c, respectively. For example, NCT technology is predicted to have the worst performance, with significant erosion in a center portion of each data track, but little to no erosion at the edges or boundaries between data tracks. Although FTS and FCAC are predicted to perform better than NCT, both are still predicted to incur significant erosion in the center portion of each data track.

Figure 5:
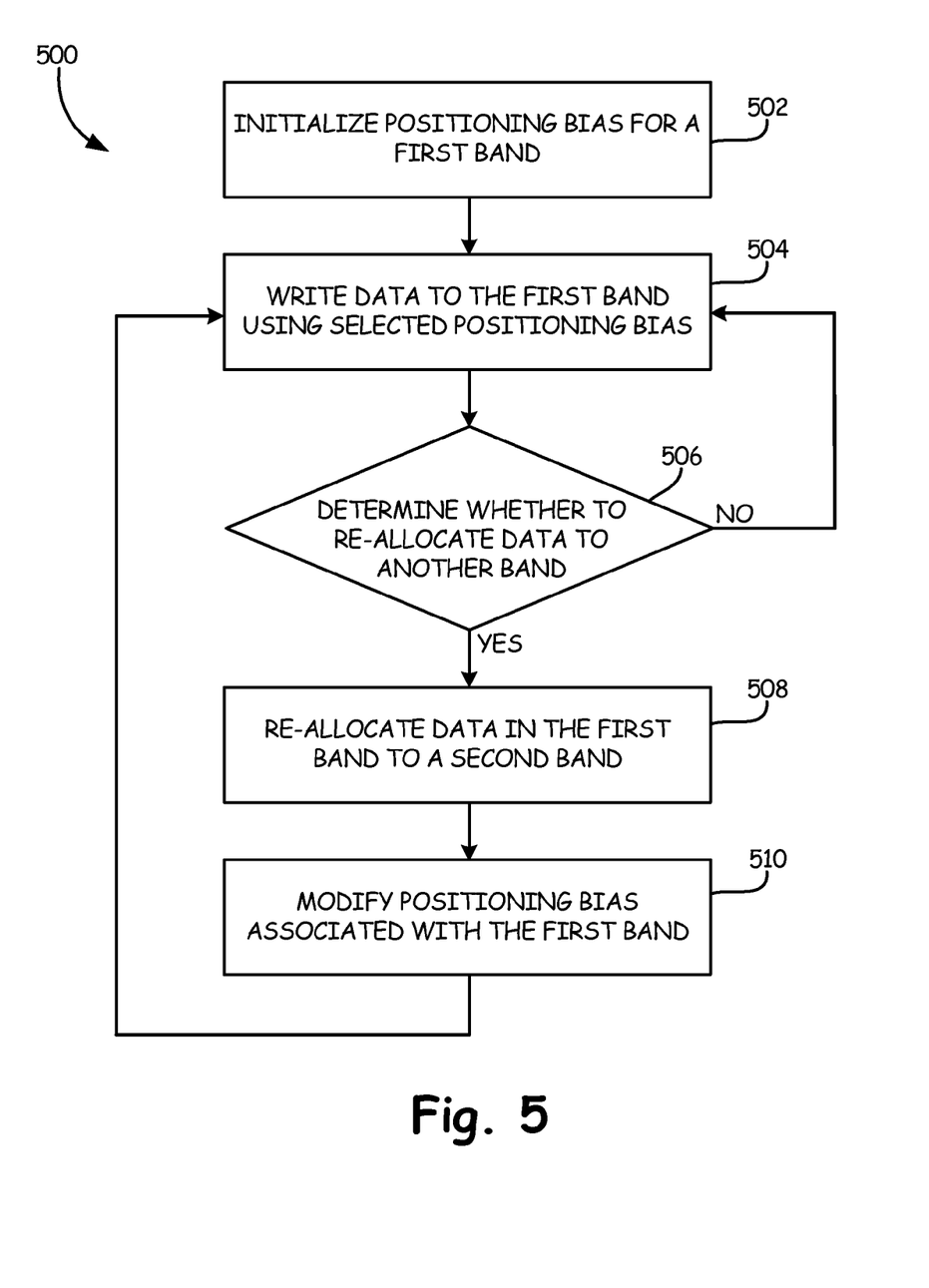
FIG. 5 is a flowchart illustrating a method of evenly distributing exposure of the magnetic media to thermal energy by biasing the position of the HAMR read/write head according to an embodiment of the present invention.

FIG. 5 is a flowchart illustrating a method 500 that evenly distributes thermal exposure of a magnetic media across the width of each data track according to an embodiment of the present invention. Rather than center HAMR read/write head 106 in the middle of each data track with respect to each write operation, the present invention selectively biases the location of HAMR read/write head 106. Given a sufficient number of write operations utilizing different positional biases, thermal energy is evenly distributed along the entire width of each data track. As a result of this even distribution of thermal energy, erosion of magnetic media 110 is also evenly distributed across each of the plurality of data tracks. Method 500 is described with respect to a particular band (i.e., collection of tracks), but the method would be applied in the same manner to each of the plurality of bands into which the data tracks are organized.

At step 502, an initial positional bias is selected for the first band. In one embodiment the initial positional bias is set equal to zero, such that read/write head 106 is positioned in the center of the track (or top of the track, depending on the definition of what constitutes the center of a data track). In other embodiments, initial positional bias is set equal to a non-zero value (positive and/or negative, again depending on the definition of center track) to move the location of read/write head 106 away from the center of the data track.

At step 504, data is written to the first band using the selected positional bias. If this is the first time data has been written to the first band, then the selected positional bias will be the initial positional bias. Data is written to the first band using heat-assisted magnetic recording (HAMR), which may include perpendicular magnetic recording schemes and/or shingled magnetic recording (SMR).

At step 506, a determination is made as to whether to re-allocate data in the first band to another band. In shingled magnetic recording—in which a data track cannot be simply re-written without destroying data in an adjacent track—data is periodically re-allocated to a different band and the current band is initialized to receive new data. Although not required in traditional perpendicular (or parallel) recording schemes, this concept is utilized to allow the positional bias of the HAMR read/write head to be modified without adversely affecting the validity of data in adjacent tracks. If the threshold number of write operations has not been exceeded, then the method continues at step 504 with additional write operations to the first band using the same positional bias. If the threshold number of write operations has been exceeded, then the method proceeds to step 508 and 510, discussed in more detail below.

A variety of different types of thresholds may be utilized to make this determination, and different thresholds may be employed depending on the type of magnetic recording technique employed. For example, in a traditional perpendicular magnetic recording technique, the threshold may be total number of write operations made to locations within the first band. This count of total write operations made to the first band may be stored in memory by the servo control system responsible for radially positioning HAMR read/write head 106 and administering write operations. In other embodiments, the validity of data associated with the first band is used as a threshold, wherein when data validity falls below a threshold value, then the method proceeds to step 508 and 510. Validity is typically represented as a percentage, and indicates the number bits in the band written with valid data. This type of threshold is often-times employed in SMR systems to determine when to re-allocate data from one band to a new band.

In some embodiments, the write thresholds utilized at step 506 are uniform across all bands. However, in other embodiments, these write thresholds can be varied for each band to account for differences in thermal exposure experienced by each band. For example, bands associated with an inner diameter of the magnetic media may be assigned lower write thresholds than bands associated with the outer diameter of the magnetic media. This is because the data tracks in inner diameter bands are written at slower linear velocities, and are therefore subjected to longer thermal exposures per each write operations. Selecting and applying different write thresholds for each band takes into account these differences.

At step 508, having exceeded the threshold value at step 506, data in the first band is re-allocated to a different band. When re-allocated, valid data from the first band is re-written to a different band. As a result, the first band is cleared of valid data and is ready to be re-written with new data.

At step 510, the positional bias associated with the first band is modified. For example, in one embodiment the positional bias is modified from a value of 0 (i.e., no bias) to a value of ½ track pitch. As a result of this modification, subsequent writes to the first band will be offset from the center of the track by a value of ½ track pitch. As compared with data previously written to the first band, data subsequently written to the first band—at step 504—would appear shifted by ½ a track width. As a result, the high-temperature thermal pulse provided by laser 200 is centered on a different portion of each track in the first band.

In one embodiment, having re-allocated data in the first band to a second band and modified the positional bias associated with the first band, new data is written to the first band. In other embodiments, however, having modified the positional bias associated with the first band, the data written to the second bad is re-written back to the first band. In this way, the second band acts as a buffer band to hold valid data until the first band can be re-written using the modified positional bias. This process is particularly beneficial in applications in which each of the plurality of bands have different data capacities. For example, a band located on the outer diameter (OD) of magnetic media may have a larger data capacity than a band located closer to the inner diameter. As a result, it may not be possible to permanently write data from the larger capacity band to a smaller capacity band. The use of one or more buffer bands allows data to be re-written to the same band it previously occupied, albeit with a different positional offset.

This process continues, with the positional bias associated with the first band being modified each time the threshold is reached with respect to the first band. For example, in one embodiment the positional bias is modified according to a schedule, with the predetermined bias schedule as follow: 0; ½; ¼; ¾; ⅛; ⅞; ⅜; ⅝; $1/16$; $15/16$ . . . etc. The schedule may be stored in memory maintained and/or accessible to the servo control system. Because the positional bias may be different for each of the plurality of bands, a separate schedule may be maintained in memory for each band.

In another embodiment, rather than a schedule, a random number between 0 and 1 is selected each time a new positional bias is required. A random number generator may be employed locally by the servo control system, or random number may be provided to servo control system from an external source. A benefit of a random number generator is that no schedules are required to be stored with respect to each of the plurality of bands. Rather, each time the positional bias associated with a band is modified, a new random value is generated by the random number generator.

Figure 6:
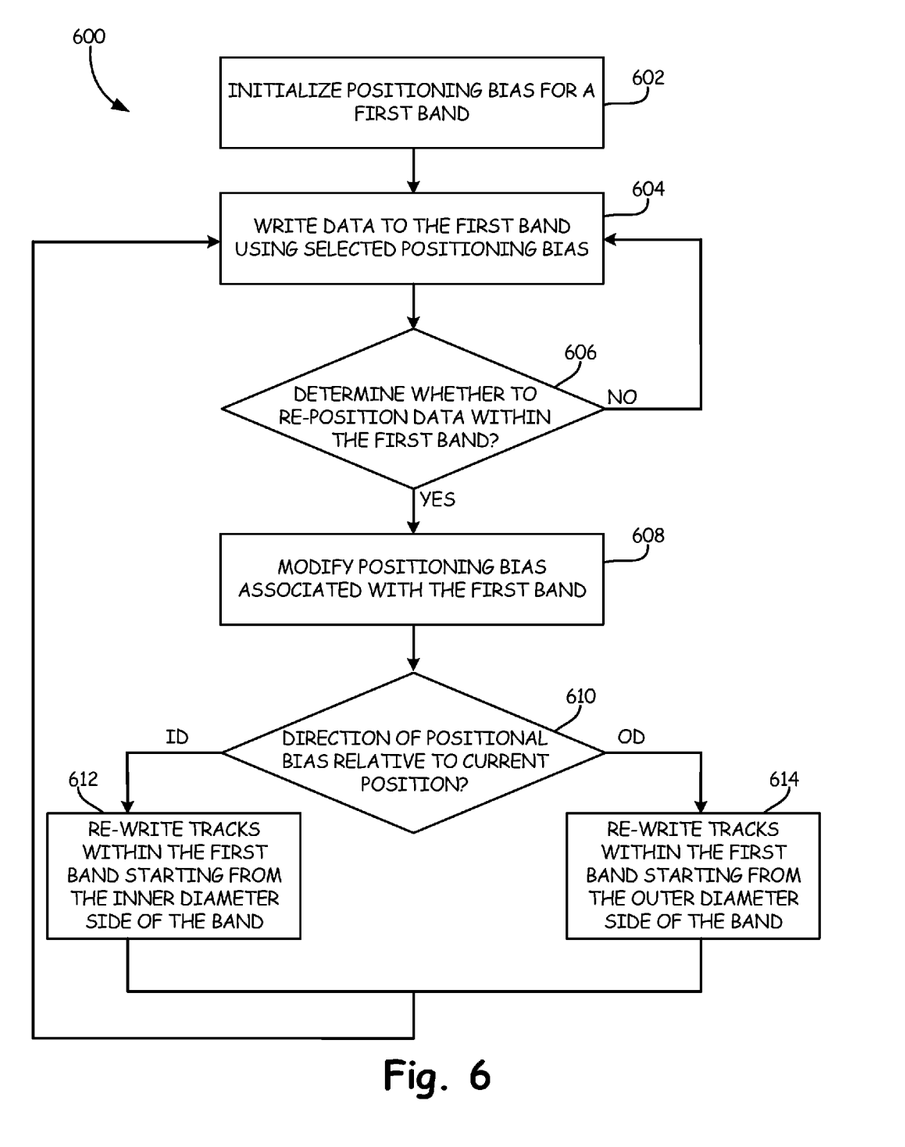
FIG. 6 is a flowchart illustrating another method 600 of evenly distributing thermal exposure of a magnetic media across the width of each data track according to an embodiment of the present invention.

FIG. 6 is a flowchart illustrating another method 600 of evenly distributing thermal exposure of a magnetic media across the width of each data track according to an embodiment of the present invention.

Steps 602, 604, 606, and 608 are similar to those steps discussed with respect to method 500. In particular, at step 602 an initial positional bias is selected for the first band. At step 604, data is written to the first band using the selected positional bias. At step 606, a determination is made as to whether a threshold has been reached with respect to the first band. Once again, a variety of different types of thresholds may be utilized to make this determination, and different thresholds may be employed depending on the type of magnetic recording technique employed. If a threshold has not been reached, this the method continues at step 604. If a threshold has been reached, then at step 608 the positional bias associated with the first band is modified.

In contrast with the embodiment described with respect to FIG. 5, rather than write data from the first band to a second band, data tracks are re-written within the first band using the modified positional bias. However, when re-writing tracks using the new positional bias care must be taken not to over-write data in adjacent data tracks. To prevent the overwriting of data in adjacent data tracks, the direction of the positional bias is used to determine whether to start re-writing data from the inner diameter of the band or from the outer diameter. For example, if the modification to the positional bias selected at step 608 is toward the inner diameter, then the band is re-written starting with the data track located on the inner diameter side of the band. Likewise, if the modification to the positional bias is toward the outer diameter, then the band is re-written starting with the data track located on the outer diameter side of the band.

Figure 7:
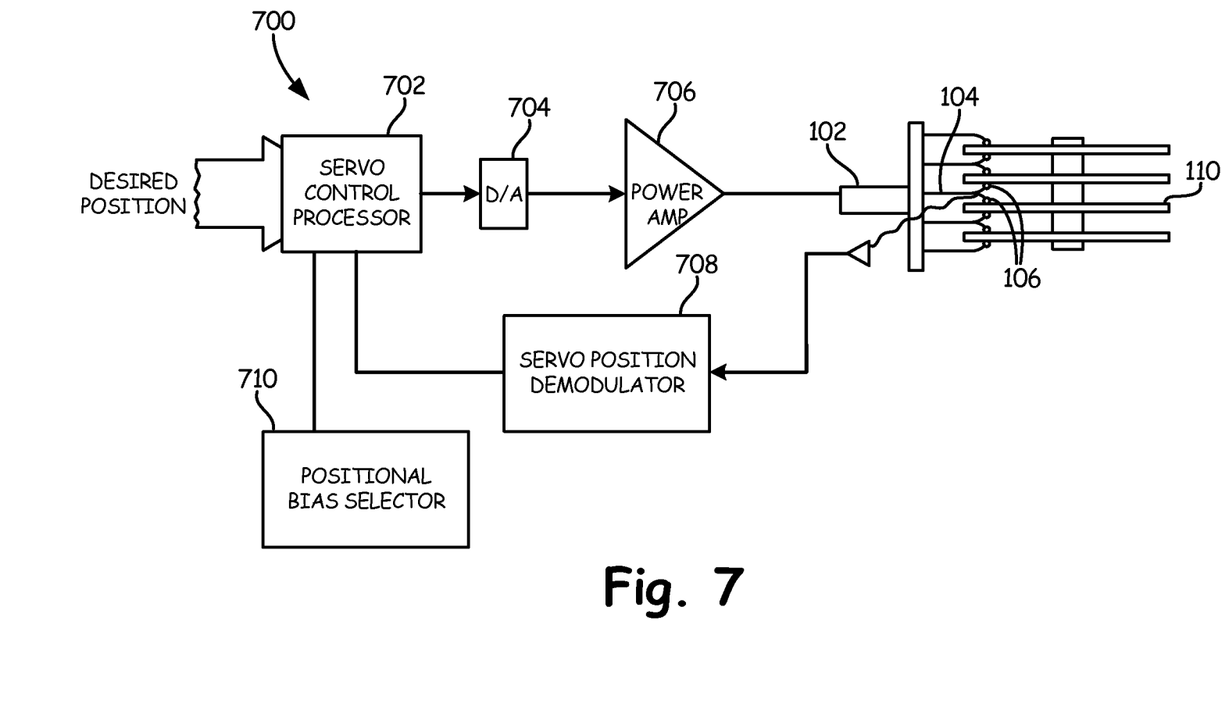
FIG. 7 is a block diagram of a servo control system that implements a method of evenly distributing exposure of the magnetic media to thermal energy according to an embodiment of the present invention.

In the embodiment shown in FIG. 6, at step 610 the direction of the positional bias is evaluated. If the positional bias is towards the inner diameter, then at step 612 the data tracks within the first band are re-written starting with the data track located on the inner diameter side of the band, with subsequent writes working radially outward. Conversely, if at step 610 the direction of the positional bias is towards the outer diameter, then at step 614 the data tracks within the first band are re-written starting with the data track located on the outer diameter side of the band, with subsequent writes working radially inward. A benefit of this approach is that it does not require involvement of a second band, either as a permanent storage place for the data from the first band or as a temporary buffer band. FIG. 7 is a block diagram of servo control system 700 that implements a method of evenly distributing thermal exposure of the magnetic media according to an embodiment of the present invention. In the embodiment shown in FIG. 7, servo control system 700 includes servo control processor 702, digital to analog converter (D/A) 704, power amplifier 706, servo position demodulator 708, and positional bias selector 710. During normal operation, servo control processor 702 receives commands regarding a desired track position. In response, servo control processor 702 issues commands that are converted from a digital format to an analog format by D/A converter 704. The resulting analog signal is supplied to power amplifier 706, wherein the amplified signal drives voice coil motor (VCM) 102 (shown in FIG. 1), actuating actuator arm 104 and positions HAMR read/write head 106 over a desired track (i.e., desired radial position). In addition, prior to writing data to magnetic media, servo sectors are sensed by read/write head 106 to provide feedback regarding the precise location of the read/write head relative to the data track to be written.

Figure 8:
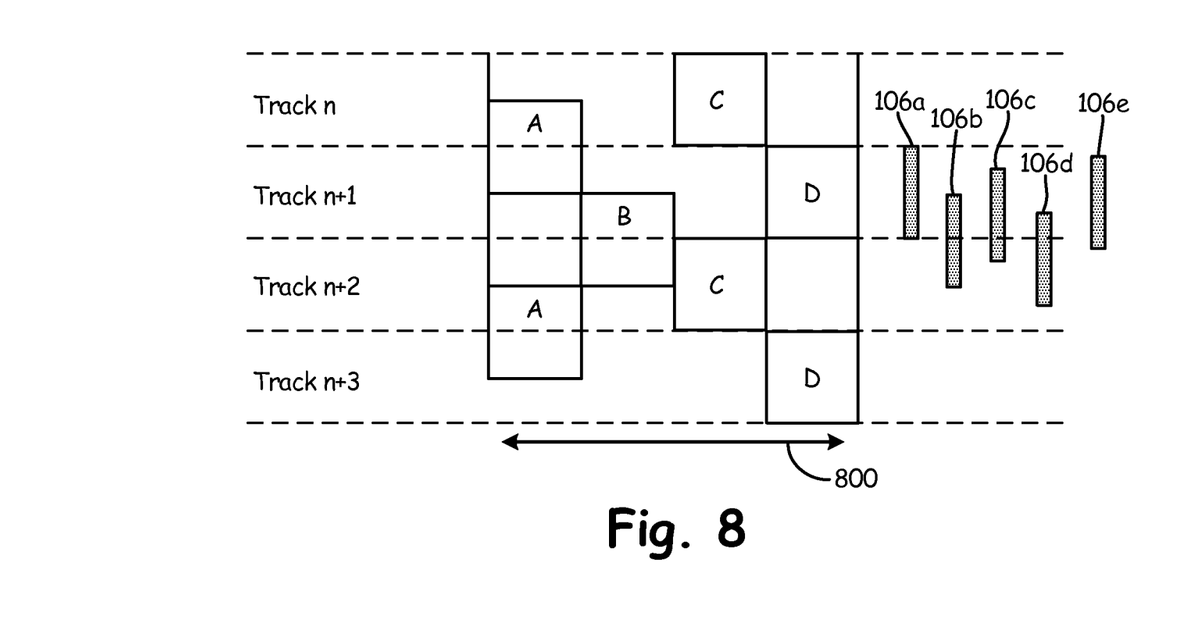
FIG. 8 is a top view of a servo field located on the magnetic media that is utilized to provide feedback in positioning the read/write head over the desired track.

For example, a servo sector may utilize an ABCD servo burst zones—such as that shown in FIG. 8—and a common A-B "nulling" scheme to center read/write head 106 on the data track. The basic idea is that when read/write head 106 is centered exactly over the boundary of the A-B zones, superposition of the resulting feedback signal is null. Mis-alignment of the read/write head 106 results in a signal that indicates the direction and magnitude of the mis-alignment. Servo position demodulator 708 receives the servo sector feedback and provides a corrective bias to servo control processor 702 to correct the position of read/write sensor to the center of the data track (i.e., the boundary between A-B servo sections).

In addition, positional bias selector 710 provides input to servo control processor 702 regarding the positional bias to be applied with respect to a particular write operation. In one embodiment, positional bias selector 710 is a table stored to local memory, either of servo control processor 702 or local random access memory (RAM) accessible by servo control processor 702. Positional bias selector 710 may also store write thresholds associated with each band, as well as write data required for comparison to the threshold. For example, positional bias selector 710 may store a count of total write operations made to each of the plurality of bands. In addition, positional bias selector 710 may maintain a list of the positional biases to be applied each time a threshold is reached.

The exemplary list of positional biases described above included to 0; ½; ¼; ¾; ⅛; ⅞; ⅜; ⅝; 1/16; 15/16... etc., which would be stored by positional bias selector 710. In other embodiments, positional bias selector 710 includes the random number generator responsible for generating a random positional bias value each time a new positional bias is required by servo control processor 702. In response to the command signal, the feedback provided by servo position demodulator 708, and the positional bias provided by positional bias selector 710, servo control processor selectively positions read/write head 106 over the desired portion of magnetic media 110.

Referring again to FIG. 8, exemplary read/write head positions are illustrated with respect to data track N+1. Read/write head 106a represents read/write position when the positional bias is initialized or set equal to 0. Read/write head 106b represents read/write position when the positional bias is ½. Likewise, read/write head 106c represents read/write head position when the positional bias is ¼, and read/write head 106d represents read/write head position when the positional bias is ¾. FIG. 8 illustrates visually how HAMR read/write head 106—as well as the high-temperature thermal pulse—is positioned along the entire width of data track N+1, thereby evenly distributing thermal exposure of magnetic media 110.

Figure 9:
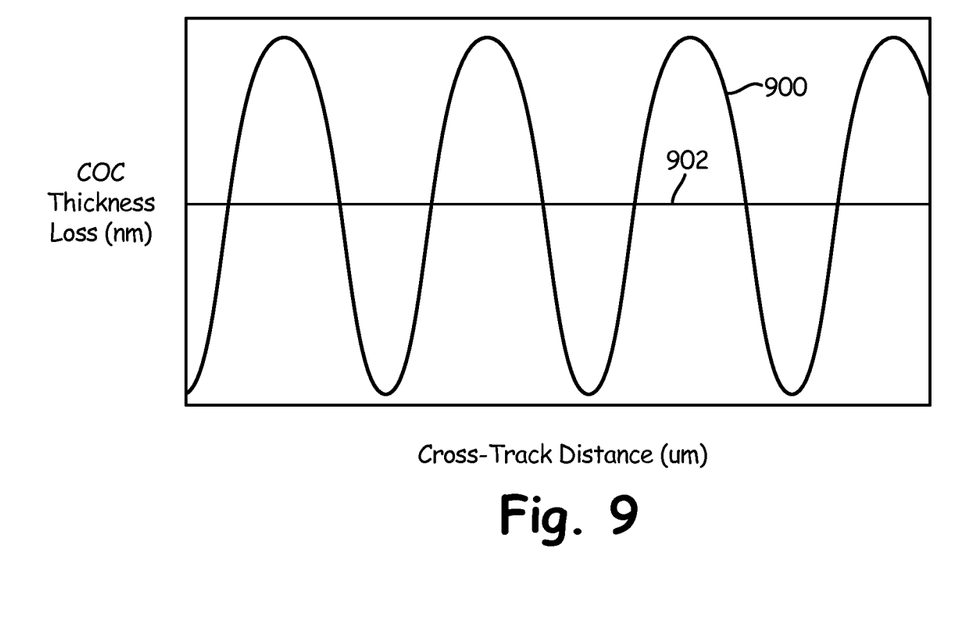
FIG. 9 is a graph illustrating the predicted erosion of the magnetic media as a result of evenly distributing exposure of the magnetic media to thermal energy according to an embodiment of the present invention, as compared with prior art methods.

FIG. 9 is a graph illustrating predicted erosion of the magnetic media as a result of utilizing the present invention as compared with traditional methods. In particular, line 900 illustrates predicted erosion resulting from typical HAMR systems (as discussed with respect to FIG. 4), and line 902 illustrates predicted erosion resulting from the HAMR system according to an embodiment of the present invention. Although the present invention will not prevent erosion of the magnetic material, the present invention does evenly distribute the erosion across the entire width of the data track. A benefit of this approach is that the useful life of the magnetic media is extended as compared with prior art HAMR systems. In addition, performance may be improved without the presence of troughs or valleys within each data track caused by repeated HAMR write operations.

Figure 10:
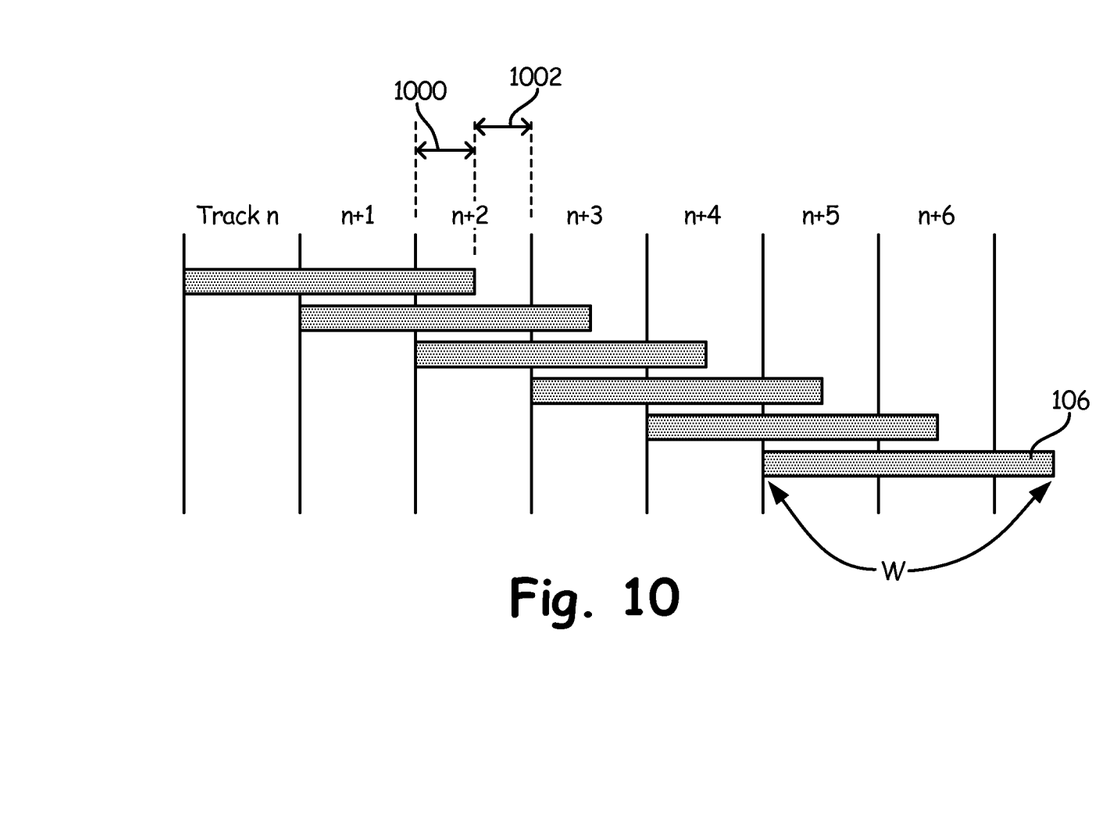
FIG. 10 is a top view illustrating write head location and overlap in a shingled magnetic recording medium.

FIG. 10 is a top view illustrating write head location and overlap in a shingled magnetic recording medium. In the embodiment shown in FIG. 10, tracks are oriented in a down-track vertical direction, with tracks labeled 'N', 'N+1', 'N+2', 'N+3', 'N+4', 'N+5', and 'N+6'. In shingled magnetic recording, read/write head 106 has a width greater than the width of the data tracks being written. In the exemplary embodiment shown in FIG. 10, read/write head 106 has a width more than twice that of the tracks. The embodiment shown in FIG. 10 illustrates that due to the width of read/write head 106, one portion of each data track will only be written twice by read/write head 106, while another portion of each data track being written three times. For example, with respect to data track 'N+2', a first portion 1000 of the data track is written three times, while second portion 1002 of the data track is written two times. The same pattern repeats itself with respect to each data track written using SMR. As a result, first portion 1000 is exposed to a disproportional amount of thermal energy as compared with second portion 1002, and as a result is predicted to experience more erosion.

In addition, because SMR requires data to be re-written to new bands periodically, the present invention can be utilized in conjunction with current SMR algorithms for determining when to re-allocate data from one band to a different band. Offsetting the position of read/write head 106—even during SMR write operations—by adding a positional bias as described above results in an even distribution of thermal energy caused by first portion 1000. In particular, the positional bias ensures that first portion 1000 is applied to different portions of each data track. For example, with a positional bias of 0 (i.e., no positional bias), first portion 1000 is located on the left side of each data track. After re-allocation of the data to a different band, and modification of the positional bias to ½, for example, the first portion 1000 would be located on the right side of each data track. In this way, exposure to high-temperature thermal pulses from laser 106 is evenly distributed across the entire width of each track.

Figure 11:
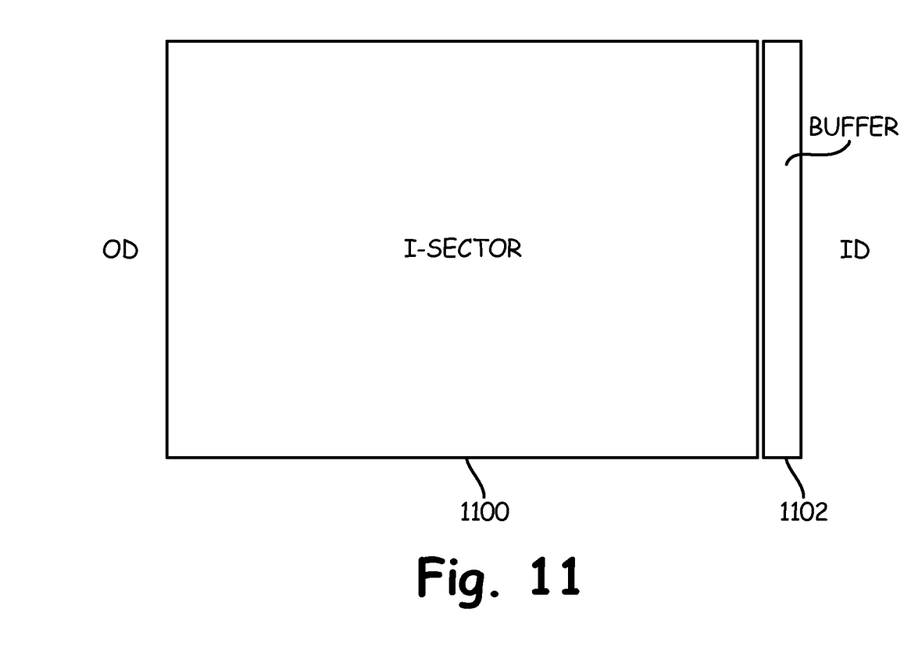
FIG. 11 is a top view illustrating data track locations and a buffer location utilized in shingled magnetic recording (SMR) medium that can be utilized to evenly distribute exposure of the magnetic media to thermal energy.

FIG. 11 is a top view illustrating respective organization of a magnetic media surface for shingled magnetic recording (SMR). In the embodiment shown in FIG. 10, a first plurality of data tracks are organized into first band or I-sector 1100, while buffer zone 1102 is located on an inner diameter of I-sector 1100. The width of buffer zone 1102 is substantially less than that of I-sector 1100. For example, I-sector 1100 may include thousands of data tracks while buffer zone 1102 may be the width of only several data tracks. In one embodiment, the width of buffer zone 1102 is at least as large as a maximum positional bias value applied. A benefit of buffer zone 1102, is that it allows various positional bias values to be applied to data tracks written in I-sector 1100, without affecting or over-writing data written in adjacent I-sector regions (not shown). Because magnetic media utilized in SMR is already organized to include a plurality of different bands or I-sectors 1100 and buffer zones 1102 located between adjacent I-sectors, SMR is well-suited to utilization of a positional bias to evenly distribute high-temperature thermal pulses supplied by laser 106 (shown in FIG. 1).

In this way, the present invention provides a system and method of evenly distributing thermal exposure of magnetic media utilized in HAMR. As a result, erosion of magnetic material caused by exposure to high-temperature thermal pulses is also evenly distributed.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of radially positioning a heat assisted magnetic recording (HAMR) head, the method comprising:
   writing data to a first band, wherein a radial position of the HAMR head within each data track is defined by a positional bias and a track location;
   determining whether a threshold has been reached with respect to the first band; and
   modifying the positional bias associated with the first band if the threshold has been reached.

2. The method of claim 1, further including:
   writing data from the first band to a second band if the threshold has been reached.

3. The method of claim 2, further including:
   re-writing data from the second band to the first band using the modified positional bias associated with the first bias.

4. The method of claim 1, further including:
   determining a direction of the modified positional bias relative to a previous positional bias;
   re-writing data tracks within the first band starting from an inner diameter portion of the first band if the direction of the modified positional bias relative to the previous positional bias is toward the inner diameter; and
   re-writing data tracks within the first band starting from an outer diameter portion of the first band if the direction of the modified positional bias relative to the previous positional bias is toward the outer diameter.

5. The method of claim 1, wherein determining whether the threshold has been reached includes maintaining a counter of write operations made to the first band and comparing the counter to a threshold value to determine whether the threshold has been reached.

6. The method of claim 1, wherein determining whether a threshold has been reached includes maintaining a validity count for the first band and comparing the validity count to a validity threshold value to determine whether the threshold has been reached.

7. The method of claim 1, wherein the first band utilizes a different threshold than other bands.

8. A servo positioning system for a heat-assisted magnetic recording (HAMR) system, the servo positioning system comprising:
   a servo position demodulator that generates feedback regarding radial position of a read head with respect to a data track within one of a plurality of bands; and
   a servo control processor that controls radial position of the read head based on a position command, a positional bias associated with the band being written, and the radial position feedback, wherein the servo control processor modifies the positional bias associated with one of the plurality of bands in response to a threshold being reached with respect to the band.

9. The servo positioning system of claim 8, wherein the servo control processor initializes the positional bias to zero a first time a band is written with data.

10. The servo positioning system of claim 8, wherein the servo control processor writes data from a first band to a second band when the threshold has been reached with respect to the first band.

11. The servo positioning system of claim 10, wherein the servo control processor writes data from the second band back to the first band using the modified positional bias associated with the first band.

12. The servo positioning system of claim 8, wherein the servo control processor re-writes data tracks within the band that reaches the threshold, wherein the servo control processor re-writes tracks within the band starting with a data track located on a side of the band that corresponds with the modified positional bias.

13. The servo positioning system of claim 8, wherein the threshold is a counter of total write operations made to each of the plurality of bands, wherein the servo control processor compares the counter to a threshold value to determine whether the threshold has been reached.

14. The servo positioning system of claim 8, wherein the threshold is validity count for each of the plurality of bands, wherein the servo control processor compares the validity count to a validity threshold value to determine whether the threshold has been reached.

15. The servo positioning system of claim 8, wherein the servo control processor maintains different thresholds for each of the plurality of bands.

16. A heat-assisted magnetic recording (HAMR) system comprising:
   a magnetic media comprising of a plurality of bands, each band comprised of a plurality of data tracks;
   a heat-assisted read/write head;

an actuator arm that supports the heat-assisted read/write head;

a voice coil motor connected to the actuator arm that selectively locates the heat-assisted read/write head over a specified data track on the magnetic media; and a servo control processor that controls radial position of the read head based on a position command and a positional bias associated with each of the plurality of bands, wherein the servo control processor selectively modifies the positional bias associated with each of the plurality of bands to evenly distribute thermal exposure of the magnetic media.

17. The HAMR system of claim 16, wherein the servo control processor selectively modifies the positional bias associated with one of the plurality of bands in response to the band reaching a threshold.

18. The HAMR system of claim 17, wherein the threshold is a number of write operations made to the one of the plurality of bands, wherein in response to exceeding the number of write operations, the servo control processor modifies the positional bias associated with the particular band.

19. The HAMR system of claim 17, wherein the servo control processor, in response to a threshold being exceeding with respect to one a first band, writes data from the first band to a second band and selectively modifies the positional bias associated with the first band.

20. The HAMR system of claim 19, wherein the servo control processor writes data from the second band back to the first band using the modifies positional bias.

21. The HAMR system of claim 16, wherein the servo control processor, in response to modifying the positional bias associated with a first band, re-writes data tracks within the first band starting with a data track located on a side of the band that corresponds with the modified positional bias.

* * * * *